May 24, 1955 — F. STUDER — 2,708,815
DEVICE FOR THE AUTOMATIC GUIDANCE OF THE PATTERN-FOLLOWER
ON A FORM-GRINDING MACHINE
Filed April 10, 1951

INVENTOR:
FRITZ STUDER

United States Patent Office 2,708,815
Patented May 24, 1955

2,708,815

DEVICE FOR THE AUTOMATIC GUIDANCE OF THE PATTERN-FOLLOWER ON A FORM-GRINDING MACHINE

Fritz Studer, Glockenthal-Thun, Switzerland, assignor to Aktiengesellschaft Fritz Studer, Glockenthal-Thun, Switzerland, a Swiss company Application April 10, 1951, Serial No. 220,216

Claims priority, application Switzerland April 14, 1950

4 Claims. (Cl. 51—100)

The present invention relates to a device for form-grinding or shaping machines in which for the automatic guidance the pattern-follower is caused to move under spring action along a template or pattern plate, the movements of the follower being transmitted by a pantograph and a parallellogram rod assembly, to a grinding wheel or tool which is pivotable about its grinding edge. The follower in this machine is thus guided along the pattern plate. The advance of the follower along the pattern was hitherto effected by hand. The object of the device in accordance with the present invention is to control this movement automatically, so that the operator is released for other work during this time. Apparatus of this type employing pantographs are known per se, reference being had to applicant's U. S. Patent 2,038,455.

The device in accordance with the invention is characterized by drive means for imparting longitudinal movement to a slide to which two approximately parallel rods are swivelly secured, the ends of which rods are swivelly connected to and adjustable with the follower, so that the latter can be fixed together with its tip end in any desired angular position to the pattern plate.

It is therefore an important object of the present invention to provide means for swivelly supporting the pantograph mechanism as well as the follower and to provide the latter with a wedge-shaped or tapered tip to thereby more accurately adjust the follower to the pattern plate and to effectuate any desirable angular position or inclination of the follower to the latter.

Another object of the invention resides in the provision of means for varying the effective length of rod means interconnecting the driven slide of the machine with the follower.

Yet another object of the present invention is to provide means facilitating easy checking of the workpiece during operation of the machine, due to accessibility of the workpiece.

Still another object of the invention is to provide means envisaging improvements in the drive of the slide actuating the follower.

These and other objects of the invention will become further apparent from the following detailed description, reference being made to the accompanying drawing, showing preferred embodiments of the invention.

The annexed drawing diagrammatically illustrates embodiments of the invention. In the drawing.

Figure 3:
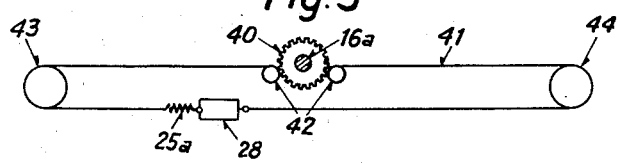
Figure 4:
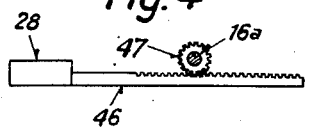

Fig. 3 diagrammatically shows the actuation of the slide by a chain;

Fig. 4 shows the actuation of the slide by means of a rack and pinion; and

Figure 5:
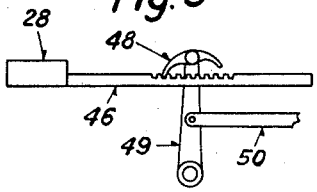

Fig. 5 shows the actuation of the slide by means of a rack and pawl.

Figure 1:
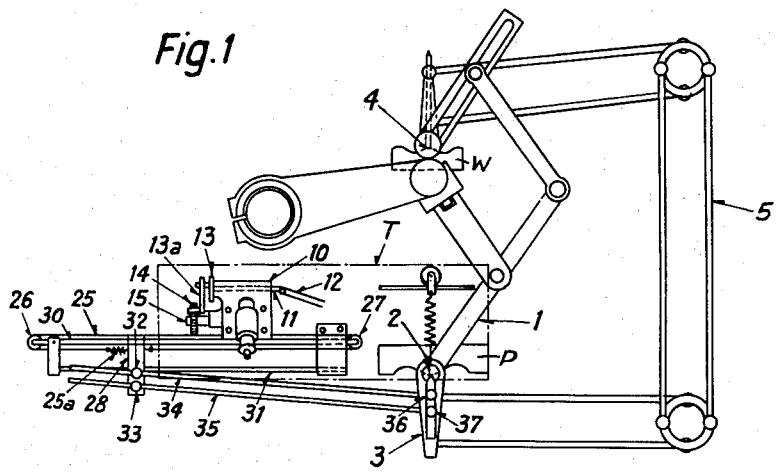
Fig. 1 is a plan view of a form-grinding machine of known type with the device according to the invention arranged thereupon.

Referring more particularly to Fig. 1, there is disclosed an arm 1 of a pantograph of a shaping machine whose pattern follower 3 is mounted as to be urged by a spring F against and along a template or pattern plate P. The follower 3 is arranged for pivotable support about the tip 2 of the follower 3. The pantograph transmits the movement of the follower tip to the edge of a grinding wheel 4.

The parallelogram rod assembly 5 serves to transmit the angular position of the follower 3. The grinding of workpieces W of some length requires a relatively long time. It is now proposed, according to this invention, to enable the follower to be automatically moved for the performance of such work. The device as shown in Fig. 1 comprises a bracket 10 screwed or bolted to the table T of the machine carrying pattern or template P. Mounted in the bracket 10 is a drive shaft 11 actuated from a rotating part of the machine through a ball- and socket-jointed rod 12. The shaft 11 is provided at its forward end with a crank 13 whose crank-rod 13a actuates a ratchet wheel 14 through a pawl. The ratchet wheel 14 is mounted on a shaft 15 (Fig. 2) and drives by means of worm 15a the wormwheel 16 which is coupled to the shaft 16a by means of a taper 22. The shaft 16a has a longitudinal axial bore in which extends a screw 17 which is screwed into the shaft 16a by means of the screwthreads 18 and the knurled knob 19. At its forward end the screw 17 is provided with a fixed nut 20, so that when the screw 17 is turned the wormwheel 16 can be pressed up against the taper 22 of the shaft 16a whereby said wormwheel is coupled to said shaft 16a. Mounted on the shaft 16a is a cable sheave 24 around which is looped a wire cable 25 which is guided over sheaves 26 and 27 (Fig. 1) mounted at the respective ends of a bar or rod 30. This wire cable 25 is connected by a spring 25a to the slide 28 which glides on two bars 30 and 31.

The bars or rods 34 and 35 are pivotally attached, by means of set screws 33' and swivel bolts 32 and 33 respectively, to the slide 28, said rods 34 and 35 being secured, likewise swivelly, to the follower 3 by means of the bolts 36 and 37, respectively. When the cord sheave 24 is uncoupled, the slide 28 can be moved to and fro by turning said sheave 24 through the manipulation of the hand of an operator on knurled collar 16b. The shaft 15 may be continuously driven instead of being driven through a ratchet gear.

Because of the connection between the slide 28 and the follower 3 the angular disposition of the latter with respect to the pattern plate may readily be varied. This is effected by loosening of set screws 33' (Fig. 2) and changing of the effective length of each rod 34 and 35 by adjusting the lengths of said rods between the slide and the follower. This can readily be accomplished merely by sliding of the rods through the swivel bolts 32 and 33 since these latter can turn in their respective settings. Thereafter set screws 33' are tightened and the new angular disposition of follower 3 relative to slide 28 is fixed. As a result the specially shaped or tapered follower tip 2 can be positioned at that angle producing the best results for the particular operation being performed.

Figure 2:
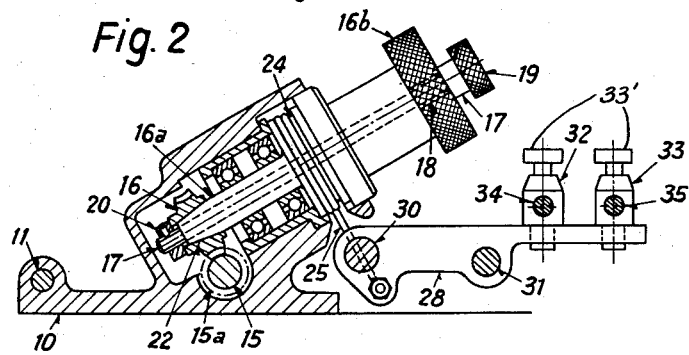
Fig. 2 is a cross-section through the cable-drum drive.

In place of the means shown in Figs. 1 and 2 for driving the slide 28, other means may be employed. Fig. 3 shows an embodiment in which, instead of a cable sheave or drum, a chain sprocket 40 is mounted on the wormwheel shaft 16a, said sprocket being engaged by a chain 41 which is held in operative position with the chain sprocket 40 by means of rollers 42. The chain 41 is trained over sprockets or guide pulleys 43, 44 and connected at one end through a spring 25a to the slide 28 and secured at its other end to said slide 28.

Fig. 4 shows the actuation of the slide 28 by means of a rack 46 with which a pinion 47 engages, said pinion being mounted on the wormwheel shaft 16a.

Fig. 5, like Fig. 4, shows the slide 28 connected to a rack 46, but with the rack actuated by a pawl 48 engaging with said rack and mounted on a lever 49 which is connected by a rod 50 to a suitably actuated part of the grinding machine (not shown).

While several preferred embodiments of the invention have been shown and herein described, it will be understood that they are capable of modification without departure from the general scope and spirit of the invention as defined in the claims.

Having thus described the invention, what is claimed as new and desired to be secured by Letters Patent, is:

1. In a pattern-shaping machine having a follower with a tapered tip sensing along the contour of a pattern plate and connected to a shaping tool by means of a pantograph, said follower being connected to said pantograph for angular adjustment through an axis passing through the end of said tip; a slide, means for linearly driving said slide, rod means extending between said follower and said slide, and a plurality of swivel means connecting said rod means to said follower and to said slide, respectively, said swivel means including means for releasably clamping said swivel means to said rod means, whereby upon operation of said clamping means said swivel means may be released from said rod means to facilitate variation of the inclination of said follower tip relative to said pattern plate.

2. A machine according to claim 1, said rod means including two substantially parallel spaced elements.

3. A machine according to claim 2, said releasable clamping means including two pairs of bolts swivelly connecting each of said elements to said follower and to said slide, respectively.

4. A pattern-shaping machine comprising, in combination, a worktable for supporting a workpiece to be shaped in accordance with the contour of a pattern plate, a spring-urged follower having a tapered tip for sensing along the contour of said pattern plate, a tool for shaping said workpiece, a pantograph mechanism connecting said follower with said tool, whereby movement of said follower along said plate is transmitted to said tool for corresponding movement of the latter with respect to said workpiece, a parallelogram rod assembly connecting said follower with said tool, whereby the angular position of said follower is transmitted to said tool, a slide, a pair of substantially parallel rod elements between said follower and said slide, means releasably clamping said follower and said slide, respectively, to each of said rod elements, whereby upon operation of said clamping means the effective lengths of said rod elements may be changed to thereby vary the inclination of said follower tip relative to said plate, and means for driving said slide.

References Cited in the file of this patent

UNITED STATES PATENTS

| | | |
|---|---|---|
| 1,841,852 | Snarry | Jan. 19, 1932 |
| 2,018,697 | Zwick | Oct. 29, 1935 |
| 2,038,455 | Studer | Apr. 21, 1936 |
| 2,290,051 | Hinkley et al. | July 14, 1942 |
| 2,358,393 | Greve | Sept. 19, 1944 |
| 2,560,454 | Klopak | July 10, 1951 |
| 2,645,161 | Stuart | July 14, 1953 |